US007487111B2

(12) United States Patent
Shoen et al.

(10) Patent No.: US 7,487,111 B2
(45) Date of Patent: Feb. 3, 2009

(54) ONLINE MARKETPLACE FOR MOVING AND RELOCATION SERVICES

(75) Inventors: Edward J. Shoen, Scottsdale, AZ (US); Samuel J. Shoen, Scottsdale, AZ (US); Srinivasan Venkataraman, Phoenix, AZ (US); John Anthony Kestner, Tempe, AZ (US)

(73) Assignee: U-Haul International, Inc., Phoenix, AZ (US)

( * ) Notice: Subject to any disclaimer, the term of this patent is extended or adjusted under 35 U.S.C. 154(b) by 128 days.

(21) Appl. No.: 10/083,726

(22) Filed: Oct. 19, 2001

(65) Prior Publication Data

US 2003/0078852 A1    Apr. 24, 2003

(51) Int. Cl.
*G06Q 30/00* (2006.01)
(52) U.S. Cl. .......................................... 705/26; 705/27
(58) Field of Classification Search .............. 705/26–27
See application file for complete search history.

(56) References Cited

U.S. PATENT DOCUMENTS

| | | | |
|---|---|---|---|
| 5,576,951 A | 11/1996 | Lockwood | 705/27 |
| 5,732,398 A | 3/1998 | Tagawa | 705/5 |
| 5,794,207 A | 8/1998 | Walker et al. | |
| 5,797,127 A | 8/1998 | Walker et al. | |
| 5,832,451 A | 11/1998 | Flake et al. | 705/5 |
| 5,864,818 A | 1/1999 | Feldman | 705/5 |
| 5,890,137 A | 3/1999 | Koreeda | 705/26 |
| 5,895,454 A | 4/1999 | Harrington | 705/27 |
| 5,897,620 A | 4/1999 | Walker et al. | |
| 5,903,880 A * | 5/1999 | Biffar | 705/39 |
| 5,946,660 A | 8/1999 | McCarty et al. | 705/5 |
| 5,950,172 A | 9/1999 | Klingman | 705/26 |
| 5,953,706 A | 9/1999 | Patel | 705/6 |
| 5,973,619 A | 10/1999 | Paredes | 705/5 |

(Continued)

FOREIGN PATENT DOCUMENTS

WO    PCT/US00/23350    8/2000

OTHER PUBLICATIONS

Home-Link: Hlotyak, Elizabeth; "1-stop home-buying online," Fairfield County Business Journal, Aug. 7, 2000, Proquest #58101585, 3pgs.*

(Continued)

*Primary Examiner*—Robert M. Pond
(74) *Attorney, Agent, or Firm*—Richard E. Oney; Tiffany & Bosco, PA

(57) ABSTRACT

A method of providing auxiliary services in a computer network marketplace relating to an originating transaction between a customer and a host is described. The originating transaction typically involves self-help moving and relocating, such as reserving a moving truck or trailer and other moving equipment. The originating transaction is processed by accepting customer input requested by the host. The customer can access content describing an auxiliary service relating to the originating transaction, such as services from other vendors relating to moving and relocating. The service provider is listed in the marketplace at the discretion of the host and the customer input for the originating transaction is used by the host to expedite processing of a secondary transaction for the auxiliary service between the customer and the auxiliary service provider. The customer can use the marketplace to view information on the auxiliary service provider and to purchase the auxiliary service.

12 Claims, 14 Drawing Sheets

U.S. PATENT DOCUMENTS

| | | | | |
|---|---|---|---|---|
| 5,999,914 | A | | 12/1999 | Blinn et al. ............... 705/27 |
| 6,016,504 | A | | 1/2000 | Arnold et al. ............. 705/27 |
| 6,041,310 | A | | 3/2000 | Green et al. .............. 705/27 |
| 6,049,777 | A | | 4/2000 | Sheena et al. ............ 705/26 |
| 6,055,513 | A | | 4/2000 | Katz et al. ................ 705/26 |
| 6,064,980 | A | | 5/2000 | Jacobi et al. ............. 705/26 |
| 6,064,981 | A | | 5/2000 | Barni et al. ............... 705/26 |
| 6,070,148 | A | | 5/2000 | Mori et al. ................ 705/26 |
| 6,070,149 | A | | 5/2000 | Tavor et al. .............. 705/26 |
| 6,085,168 | A | * | 7/2000 | Mori et al. ................ 705/17 |
| 6,085,177 | A | | 7/2000 | Semple et al. ............ 705/26 |
| 6,092,053 | A | | 7/2000 | Boesch et al. ............ 705/26 |
| 6,101,477 | A | | 8/2000 | Hohle et al. ............... 705/1 |
| 6,101,482 | A | | 8/2000 | DiAngelo et al. ........ 705/26 |
| 6,196,458 | B1 | | 3/2001 | Walker et al. ............ 705/26 |
| 6,219,653 | B1 | | 4/2001 | O'Neil et al. ............. 705/26 |
| 6,223,163 | B1 | | 4/2001 | Van Luchene ............ 705/1 |
| 6,246,996 | B1 | | 6/2001 | Stein et al. ................ 705/26 |
| 6,298,331 | B1 | | 10/2001 | Walker et al. .............. 705/1 |
| 6,308,160 | B1 | | 10/2001 | Rex .......................... 705/27 |
| 6,317,722 | B1 | | 11/2001 | Jacobi et al. ............. 705/27 |
| 6,317,723 | B1 | | 11/2001 | Walker et al. ............ 705/26 |
| 6,321,202 | B1 | * | 11/2001 | Raveis, Jr. .................. 705/1 |
| 6,754,636 | B1 | * | 6/2004 | Walker et al. ............ 705/26 |
| 6,970,837 | B1 | * | 11/2005 | Walker et al. ............ 705/26 |
| 7,117,166 | B2 | * | 10/2006 | Ifflander et al. .......... 705/26 |
| 2001/0037230 | A1 | * | 11/2001 | Raveis et al. ............... 705/9 |
| 2001/0047280 | A1 | * | 11/2001 | Alexander et al. ......... 705/1 |

OTHER PUBLICATIONS

Home-Link: PR Newswire; "Home-Link launches as US largest provider of customized, web-enable residential customer support programs, 22 major brokers particiapted in development," Jul. 14, 2000, Proquest #56412117, 4pgs.*

McCarthy, Mike; "Lyon Realtors adds post-sale services," Sacramento Business Journal, Jul. 28, 2000, v17i20pg3, Proquest #57653579, 3pgs.*

Gilgoff,Henry; "It's your money, . . . " Newsday, May 10, 1998, Proquest #44830127, 4pgs.*

Diehl, Michelle; "Home service provider networked with web site," Richmond Times Dispatch, Jan. 23, 2000, Proquest #48272980, 3pgs.*

MENO: "Directmoving.com announces its launch into the Middle East," Aug. 26, 2000, Proquest #95538865, 2pgs.*

Website having the domain name "www.homestore.com".

Website having the domain name "www.moving.com".

Website having the domain name "www.yellowtruck.com".

Website having the domain name "www.elance.com".

* cited by examiner

FIG. 2E eMove

Step 1: Pick location & types of help you will need make your move on eMove

You have booked your U-Haul equipment to

Move From | To
Los Angeles, CA | Phoenix, AZ

Your Pickup date is: | Your approximate arrival date is:
August 8, 2001 | August 10, 2001

— 302
— 304

Check help you need in "City 1"?
☐ Loading/Unloading
☐ Packing/Unpacking
☐ Carpet Cleaning
☐ House Cleaning
☐ Yard Work
☐ Painting
☐ Assembly/disassembly
☐ Other (please specify) _____

— 306

Check help you need in "City 2"?
☐ Loading/Unloading
☐ Packing/Unpacking
☐ Carpet Cleaning
☐ House Cleaning
☐ Yard Work
☐ Painting
☐ Assembly/disassembly
☐ Other (please specify) _____

Step 2: Review Moving Helpers in each city

Scheduled Pickup Time:
Aug 8, 2001; 8:00 AM

U-Haul Beverly Hills
2621 E. Indian School
Beverly Hills, CA-90210

Scheduled Drop Off:
U-Haul Hayden Road
Scottsdale Road
Phoenix,AZ-85281

Size of Truck:

14 Footer

Towing: None

Moving Helpers in Los Angeles, CA

1. John's Labor  √iD *  ⓢ Review — 308
   ↗ Load/Unload ↗ Pack/Unpack ↗ Carpets
2. Sam's Moving Help * √iD   ⓢ Review
   ↗ Yard Cleanup ↗ Housecleaning ↗ Carpets
3. Starving Srini  √iD **  ⓢ Review
   ↗ Load/Unload ↗ Pack/Unpack ↗ Carpets
   ↗ Yard Cleanup ↗ Housecleaning ↗ Assembly

Moving Helpers in Phoenix,AZ

1. JT Labor Express  √iD *  ⓢ Review
   ↗ Load/Unload ↗ Pack/Unpack ↗ Carpets
2. Don's Moving Help  √iD ***  ⓢ Review
   ↗ Yard Cleanup ↗ Housecleaning ↗ Carpets
3. Starving Vaughn  √iD ***  ⓢ Review
   ↗ Load/Unload ↗ Pack/Unpack ↗ Carpets
   ↗ Yard Cleanup ↗ Housecleaning ↗ Assembly √iD - What does this mean?

√iD means that the person has been verified for their identity. We want to ensure that our customers have access to safe & reliable helpers. And that is why we require all our moving helpers to verify their id.    Click more for details

*FIG. 3B* eMove                    make your move on eMove

Step 3: Review each moving help partner        Stats for last 6 months

Userid:     John                    Feedback Rating ⟋310
# of yrs on eMove:    2 ⟋312        Feedback Reviews ⟋314 ★★★★  10 (See details)

Sevice Profile

| # of moves made: | 25 |
| Hourly Rate: | $ 15 |
| Policy: | See detailed Policy |
| Availability: | Tue-Sun/ 9:00 am - 9:00pm; Not available on Mondays |

⟋316

Graphic

Hello, I am John-a student at the Phoenix Community College. I have helped customers move before and enjoy meeting new people. I am a member of the Phoenix Urban League & participate in Youth Soccer. I do everything from packing & loading to yard work & appliance assembly. Read my reviews to learn more about me

⟋318

[ Select John's Labor ] ⟋320

*FIG. 3C*

*eMove* make your move on eMove

Step 4: Schedule & Confirmation Process

Scheduled Pickup Time:
Aug 8, 2001; 8:00 AM

U-Haul Beverly Hills
2621, E. Indian School
Beverly Hills, CA-90210

Scheduled Drop Off:
U-Haul Hayden Road
Scottsdale Road
Phoenix, AZ-85281

Size of Truck:
14 Footer
Towing: None

Cancellation Policy:   See Cancellation

Policy

Schedule: — 322

August 2001
| S | M | T | W | T | F | S |
|---|---|---|---|---|---|---|
|   |   |   | 1 | 2 | 3 | 4 |
| 5 | 6 | 7 | 8 | 9 | 10| 11|
| 12| 13| 14| 15| 16| 17| 18|
| 19| 20| 21| 22| 23| 24| 25|
| 26| 27| 28| 29| 30| 31|   |

Wednesday August 8, 2001

8:00
9:00
10:00
11:00
12:00
1:00
2:00
3:00
4:00
5:00
6:00

⎫
⎬ 324
⎭

Time Estimator:

Based on our estimates of moving times, we estimate you will need about 8 hours to accomplish what you've outlined in your request.

Click here to find our more about moving help estimator tools...

You indicated that you need the following help:

☒ Loading & Unloading   ☒ Carpet Cleaning

Please tell us how many hours of labor you wish to purchase? _____ hrs

How many "moving help partners" will you need? _____

CONFIRM

ONLINE MARKETPLACE FOR MOVING AND RELOCATION SERVICES

BACKGROUND OF THE INVENTION

1. Field of the Invention

The present invention relates generally to customer/vendor marketplaces in a computer network environment. More specifically, the invention relates to an online marketplace for customers and vendors to transact business for services related to moving and allows for pre-payment of services and escrow services.

2. Discussion of Related Art

For many years, the Internet has allowed consumers of a wide variety of goods to get online and meet merchants and retailers. There are many models in which transactions between buyers and sellers of products or goods can take place. Companies in this space include some well known names such as Amazon, eBay, Priceline, Mercata, among hundreds of others. The models for such transactions include fixed prices, peer-to-peer bidding, volume purchasing, and bid and lock models. These models, as well as others, have been used for many years in the online world and have been widely successful.

However, similar models for selling services on the Internet or in online marketplaces are still evolving and have not yet had widespread acceptance. Presently, there are numerous online companies which provide marketplaces for customers and service providers, referred to as vendors, to transact business. An example of one such company is eLance which provides a shared workplace for its members who pay subscription and transaction fees. Members, e.g., a customer, bids for a service or can pay a fixed price for a service offered by a vendor. The customer and vendor then collaborate in a shared workspace. At Guru.com, customers can hire freelance vendors in a non-fee marketplace. Others include Sologig.com where freelancers can be hired for a fee and Servicemagic.com where service providers, such as plumbers, landscapers, and the like, pay a fee to bid on jobs posted by customers.

Many of the online marketplaces for services have not focused on a specific area of business. Most, if not all, service-oriented online marketplaces have taken a general character, supplying a wide variety of services in different fields without focusing on a particular business. One example of a business space that is primarily service oriented is the self-help or "do-it-yourself" moving business. In this business a customer rents a truck, trailer, or van to move their personal possessions to a new location instead of hiring a full service moving company to pack, load, unload, and transport the possessions. The Ryder Corporation, a transportation management and vehicle rental company, has a web site at Ryder.com or yellowtruck.com which allows customers to obtain information on vehicle rentals and other transportation needs. The customer can rent a vehicle and request that a service provider contact the customer in the future to enter a transaction.

The do-it-yourself moving business typically has as its primary or originating transaction between customer and vendor the renting of a van, truck, or trailer. A customer begins a move by renting a vehicle or trailer at one location and returns the vehicle at a different or same location. Often when moving, the customer may seek help for a wide variety of services. The most apparent being loading and unloading the vehicle or trailer. Customers may also seek help with packing and unpacking and with other common chores that need to be done when moving, such as housecleaning, painting, yard cleaning, garbage/waste removal, carpet cleaning, and so on. The list also includes less obvious items such as reserving a hotel room at the destination for the night before moving in and similar services at the destination, such as loading, removal of empty boxes, cleaning, assembling furniture, and so on.

Presently, customers seek moving-related services by searching the yellow pages and classifieds or asking for referrals at the moving equipment rental office, where employees are not generally permitted to provide such information but do so unofficially. The task of finding all the services a do-it-yourself moving customer may need becomes time consuming, inefficient, and disjointed. In addition, customers are typically left to choosing a vendor randomly from yellow page listings or classified ads. Customers seeking services or a vendor in a city or location different from where they live face the problem of getting information on the remote location. Obtaining such information from online yellowpages can be problematic or difficult for certain customers. In some cases customers go to Internet web sites for moving services, such as moving.com or move.com. These sites allow customers to access information and contact information of vendors regarding moving services and goods. The sites are an enhanced online yellow page listings for moving services and goods. The customer can access information on moving, such as moving tips, money saving ideas, and the like. In some cases a customer is linked to one vendor for a particular service or good as opposed to a listing of vendors along with information on rates and customer feedback. A customer visiting these sites is typically not able to transact business or make a purchase on these sites. Customers are not able to hire a vendor and pre-pay for the vendor services at the site. They are generally informational. Many of the vendors, such as those who offer the service of loading and unloading or provide housecleaning services, have minimum time or payment requirements. That is, the minimum that the customer must pay is dictated by the vendor, regardless of the level of need of the customer. For example, a student moving from shared housing to a studio will likely have to pay a vendor a minimum payment that exceeds the services actually needed by the student. The experience of moving is often not a pleasant one and calls for many disparate tasks apart from the basic job of transporting one's possession. Some of these varied tasks, if not brought "under one roof" may be overlooked and require a quick fix at the last moment. Online sites for making reservations for a truck, van or trailer for the do-it-yourself moving customer have gained widespread acceptance. Customers routinely log on and make more informed decisions on what type of moving equipment, truck size, and so on they may need. However, making arrangements for the varied services related to a move are not available at the same site despite the fact that such services, as noted above, are integral to moving and relocating.

SUMMARY OF THE PREFERRED EMBODIMENTS

Methods and systems for operating an online marketplace for the sale of services associated with self-help moving and relocating are described. In one aspect of the invention a method of providing auxiliary services in a computer network marketplace associated with an originating transaction between a customer and a host is described. An originating or primary transaction, such as reserving a truck or trailer through an online reservation system is processed after a series of screen shots prompts the user for input. The input is used to make a reservation in the name of the customer for moving equipment, typically a truck or trailer, dollies, etc., and is processed by a host reservation system. The customer has the option of entering an online or computer network marketplace where content describing an auxiliary or secondary service relating to the originating transaction is presented to the customer. The customer initiates a secondary transaction between the customer and the service provider for the auxiliary service. The service provider is listed at the online marketplace at the discretion of the host or marketplace operator. The transaction processing between the customer and the service provider, or vendor, is expedited using input provided by the customer for the originating transaction for the renting of the moving equipment.

In one embodiment the host of the online marketplace accepts a payment from the customer for the service at the time the customer is reserving the service. This payment is stored in an escrow account and is not given to the vendor until the service is completed. The online marketplace presents vendor information to a customer and allows the customer to select a vendor that best suits the customer's needs, thereby shifting control of the secondary transaction to the customer. In another embodiment of the secondary transaction is initiated upon completion of the originating transaction. In another embodiment, the auxiliary services include loading/unloading services, packing and unpacking services, housecleaning, landscaping, carpet cleaning, painting, and garbage removal services. In another embodiment the auxiliary services include hotel reservation services.

In another aspect of the invention, an online marketplace implemented on a computer network, such as the Internet, is described. The marketplace allows self-help moving customers and vendors offering services in the moving and relocating fields to enter into transactions. The online marketplace is comprised of a customer application, a vendor application, and an administrative application. The customer application processes input entered by a customer once the customer has entered the marketplace, the customer input including in particular a pre-payment for a service transaction between the customer and a particular vendor, wherein the pre-payment is held in an escrow account. The vendor application processes input entered by a vendor offering a moving related service. One example of the vendor input includes a confirmation code to activate transfer of funds from the escrow account to a vendor account. An administrative application allows a marketplace host to maintain the marketplace and gather transactional data from the customer application and the vendor application.

BRIEF DESCRIPTION OF THE DRAWINGS

FIGS. 2C and 2D are screen shots of a user interface for a reservation system in which a customer is requested to select specific rental equipment.

FIG. 2E is a screen shot of a user interface for a reservation system in which a confirmation is presented to the user and the user able to seemlessly enter an online marketplace.

FIG. 3A is a screen shot of a user interface offering moving and relocation services.

FIG. 3B is a screen shot of a user interface showing a list of vendors for general moving help in two locations.

FIG. 3C is a screen shot of a user interface presenting to a customer information regarding a selected vendor.

FIG. 3D is a screen shot of a user interface in which a customer can enter scheduling information, estimates of the work needed, and confirm the service.

DETAILED DESCRIPTION OF THE PREFERRED EMBODIMENTS

Figure 1A:
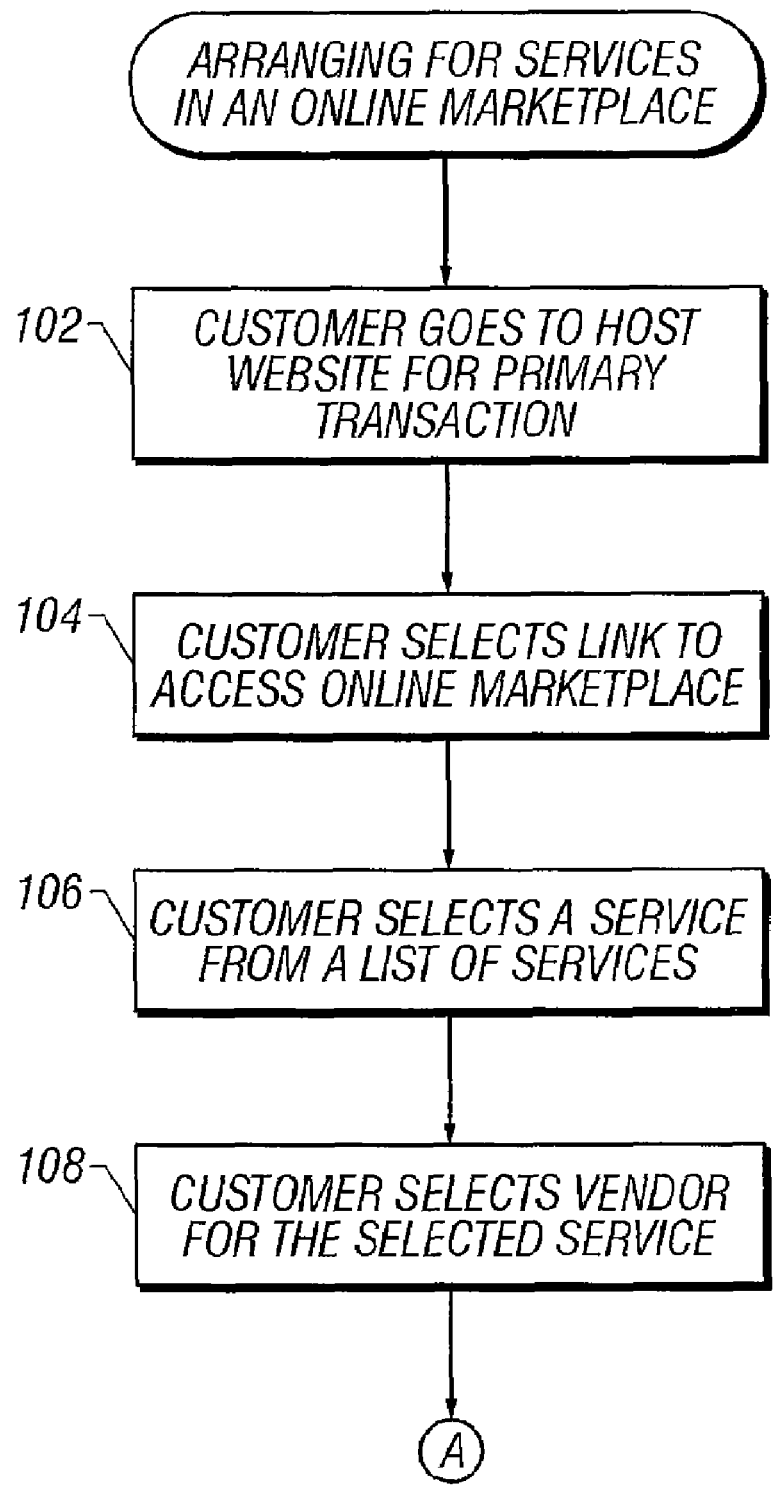
FIGS. 1A, 1B, and 1C are flow diagrams of a process in which a customer arranges for auxiliary moving and relocation services in an online marketplace in accordance with a preferred embodiment of the present invention.

Reference will now be made in detail to preferred embodiments of the invention. An example of a preferred embodiment is illustrated in the accompanying drawings. While the invention will be described in conjunction with the preferred embodiments, it will be understood that it is not intended to limit the invention to the preferred embodiments. To the contrary, it is intended to cover alternatives, modifications, and equivalents as may be included within the spirit and scope of the invention as defined by the appended claims.

The present invention is a process and system of an online or computer network marketplace where do-it-yourself moving customers enter into transactions with vendors offering moving-related services and a wide variety of services typically needed when relocating. A customer is able to enter the online marketplace either by performing an originating or primary transaction, e.g., renting a moving truck or trailer, or by-passing an originating transaction and directly entering the online moving and relocation services marketplace. The online marketplace of the present invention is beneficial to vendors offering moving-related and relocation services because the online traffic at the website hosting the marketplace is composed almost entirely of customers who are in the process of moving or planning for a move. Thus, by harnessing this unique traffic, the marketplace operator or host (e.g., a moving equipment rental company) can cross-sell services often needed by its customers. By offering customers to the online marketplace a list of vendors for these services and overseeing initial contact between customer and vendor, the marketplace operator/host can directly benefit economically and, moreover, can build greater goodwill in the minds of its customers who initially came to the site to rent moving equipment.

As noted, when people move they inevitably need various types of services: housecleaning, painting, waste removal, yard cleaning, "handyman" type work, carpet cleaning, disassembly/assembly of furniture, and loading/unloading. Some of these services, for example, carpet cleaning or waste removal, may not be immediately apparent to those moving who may be preoccupied with larger issues. If a marketplace operator can institutionalize the process or behavior of customers in obtaining these services at the time of the move, all parties involved in a transaction—operator/host, customer, and vendor—will benefit. Furthermore, if the online marketplace enables a shift in control with respect to the amount or level of services needed from the vendor to the customer, customers will benefit without necessarily harming the economic opportunities of the vendors. Customers maybe more likely to order services that they may not have thought of absent the online marketplace if they 1) have more control over how much they spend on the service; 2) are provided with a comprehensive menu or list of such services and qualified vendors for those services; 3) can order such services while making reservations for moving equipment; and 4) can view feedback on vendors from previous customers. In a preferred embodiment, the customer is required to provide feedback on a particular vendor to the host upon completion of the service by a vendor. This allows the host to provide more useful rating and feedback to future customers when selecting a vendor and further provides for the shift in control over a transaction from the vendor to the customer.

An online marketplace would allow customers to estimate the amount of labor they would need by having customers answer a series of queries about their move. In a preferred embodiment, the customer will be provided with an estimate for all the services requested and can pre-pay for the services using a credit card or other payment means. The marketplace can provide lengths of time a particular vendor has taken in the past to do a particular task. The customer can use this to estimate how many hours they will need. The amount paid is kept in a business escrow account arranged by the marketplace operator with the assistance of a third party service provider, such as PayPal, an online cash transferring service. Once the service is completed, the amount owed is deducted from escrow and paid to the vendor. The marketplace operator is also paid a predetermined amount from escrow for providing the marketplace services. Any excess funds is returned to the customer. In a preferred embodiment, an example of one of the marketplace services includes investigating identification information of each of the vendors to ensure that the contact information a vendor is providing is valid. The marketplace operator may use a third-party service provider for this task such as Experian or Equifax, companies that verify identification and contact information. Validating information provided by a vendor wanting to be on a list of vendors would likely provide customers with the desired assurance that the customers will be doing business with legitimate vendors. The marketplace operator can also take steps to ensure that the vendors are reputable, have a presence in a community, or have specialties in certain areas. These features are described in greater detail below.

Figure 1B:
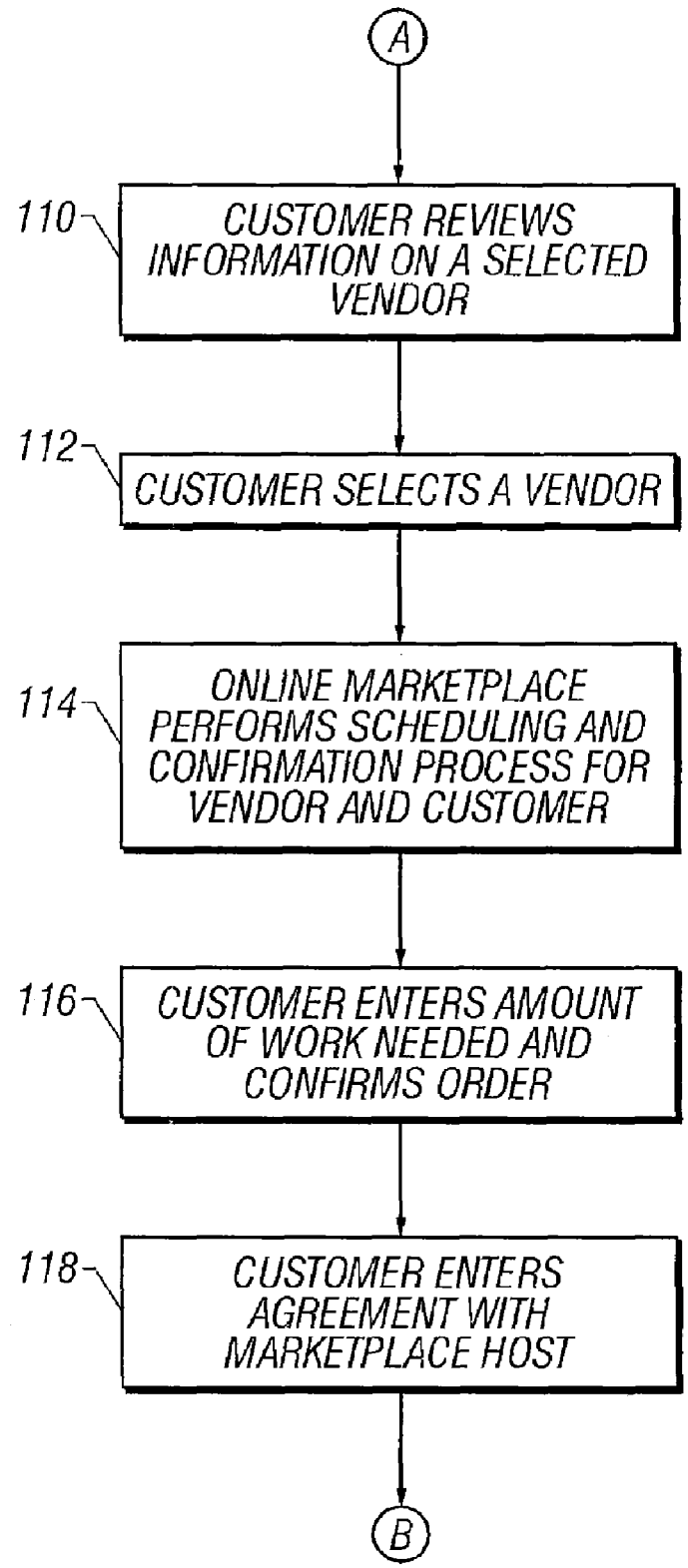
Figure 1C:
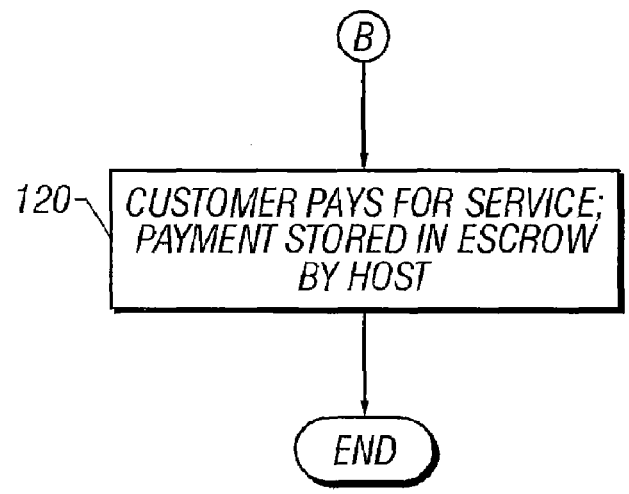
Figure 2A:
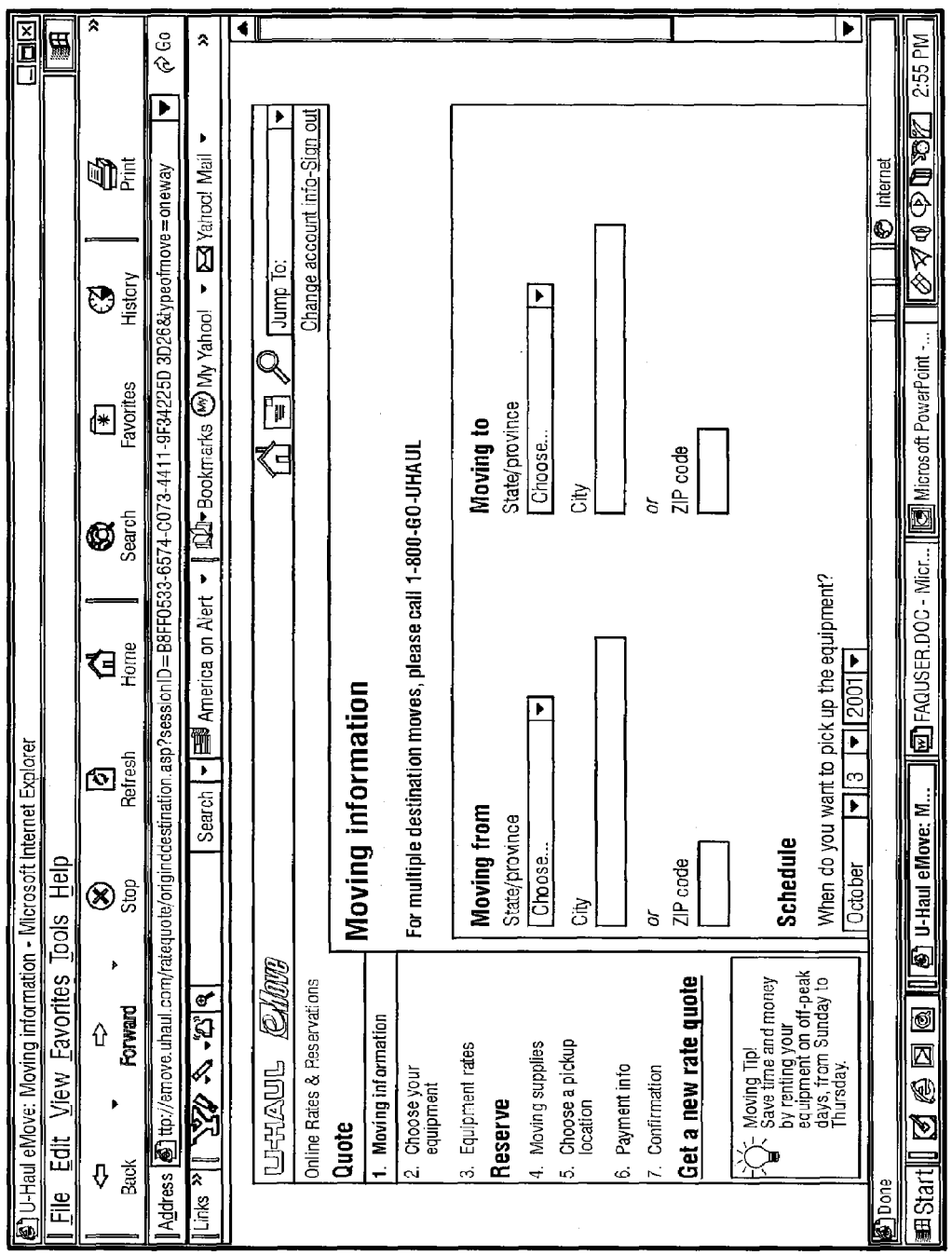
FIG. 2A is a screen shot of a user interface for a reservation system in which basic moving and rental information is requested from the customer.
Figure 2B:
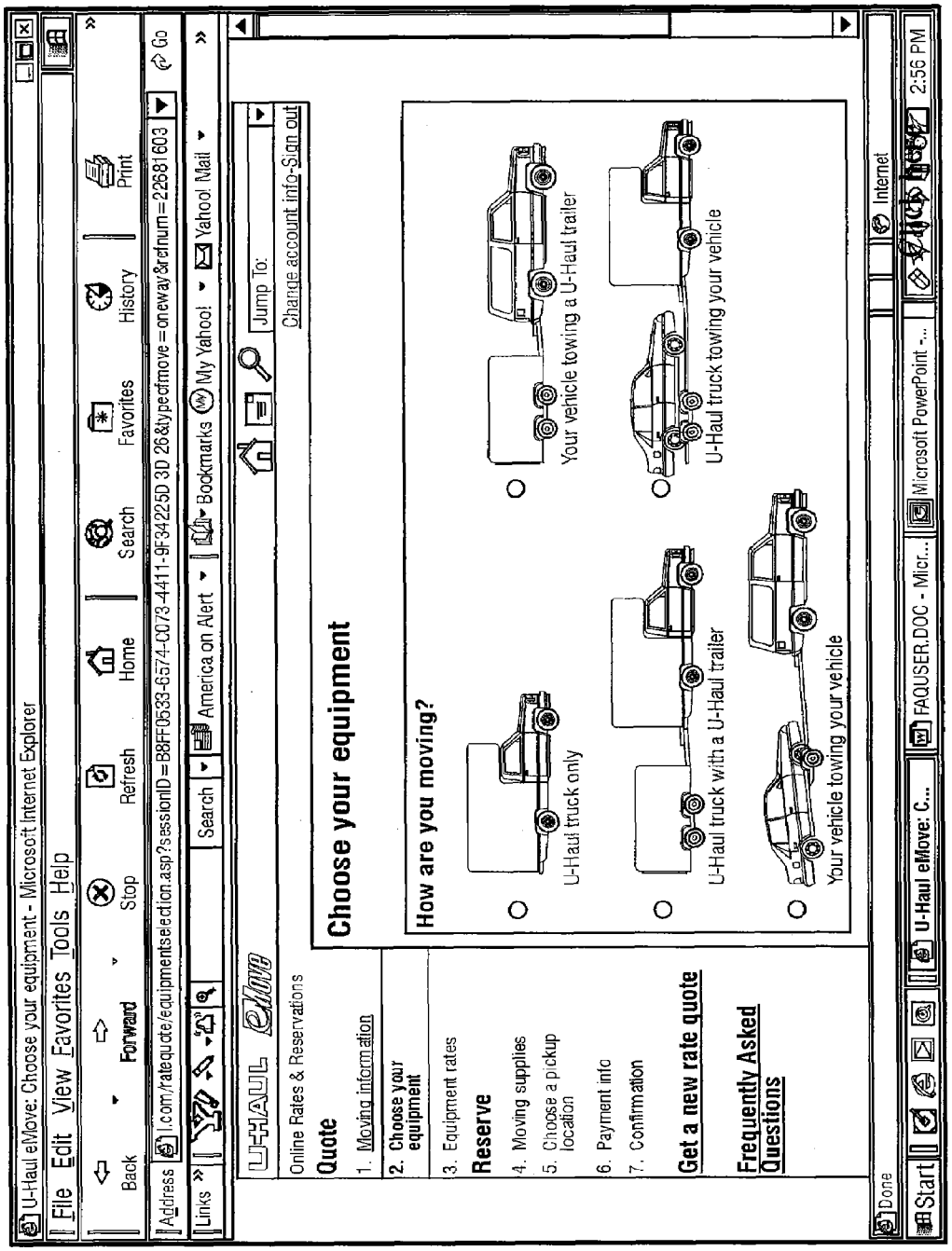
FIG. 2B is a screen shot of a user interface for a reservation system in which a customer is requested to select the type of equipment to be rented.
Figure 2C:
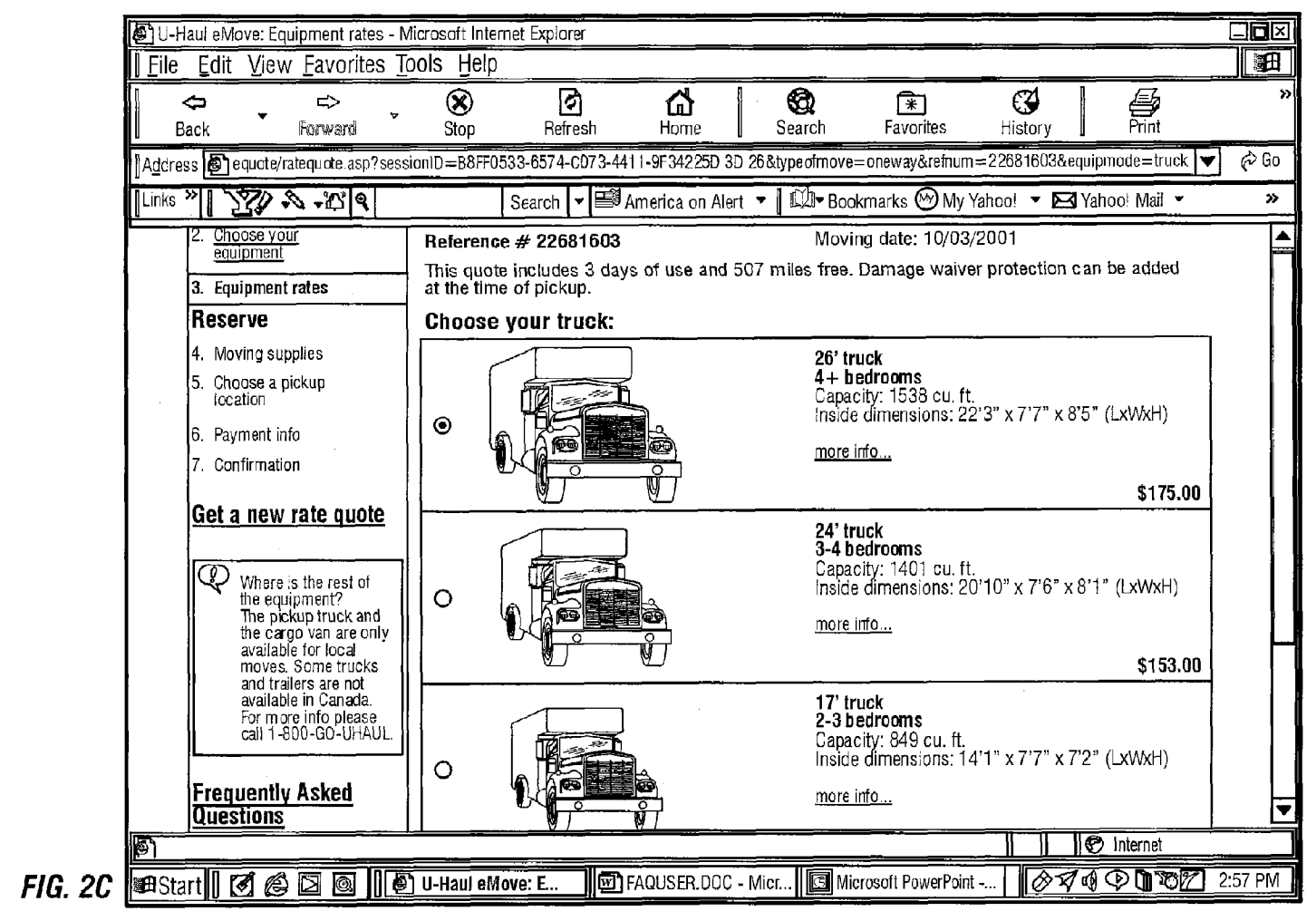
Figure 2D:
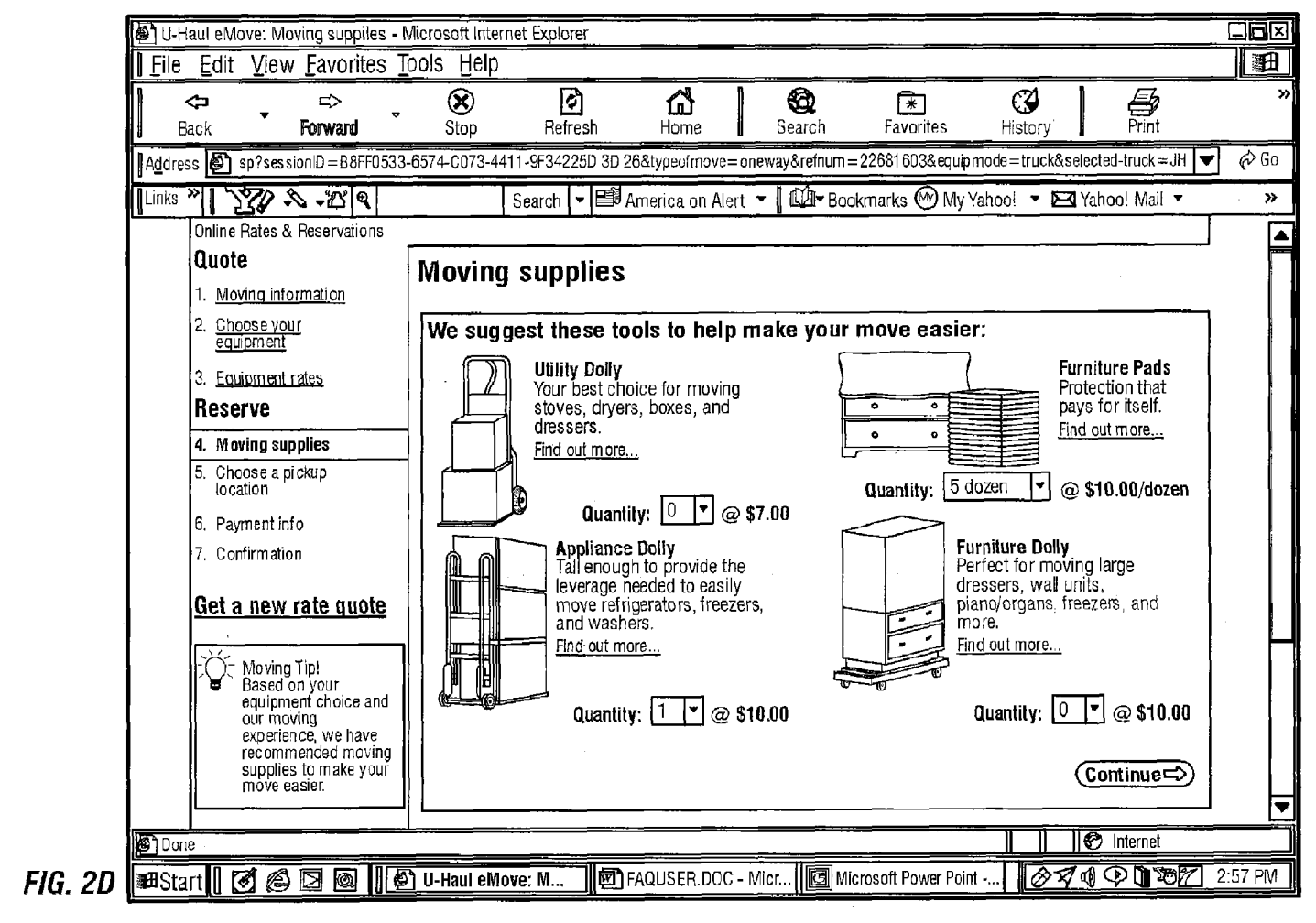

FIGS. 1A, 1B, and 1C are flow diagrams of a process in which a customer arranges for auxiliary moving services in an online marketplace in accordance with a preferred embodiment of the present invention. At step 102 of FIG. 1A, the customer visits the marketplace operator or host web site with the initial goal of reserving equipment for moving. In most cases this means renting a truck, van, trailer, or towing equipment. The customer enters information regarding what dates the equipment will be needed and the pick-up and drop-off locations. An example of the screen shot displaying the fields used to capture this information is shown in FIG. 2A. FIGS. 2B, 2C, and 2D are screen shots of a user interface where the user can choose specific equipment for moving. In FIG. 2B, the customer is asked how he is moving and is provided with various options. To follow one example, if the customer chooses a truck, he is presented with FIG. 2C, a screen shot where the customer chooses the size of the truck and is given estimates how much can be moved in different sizes. FIG. 2D is a screen shot where the customer can rent moving supplies.

Figure 2E:
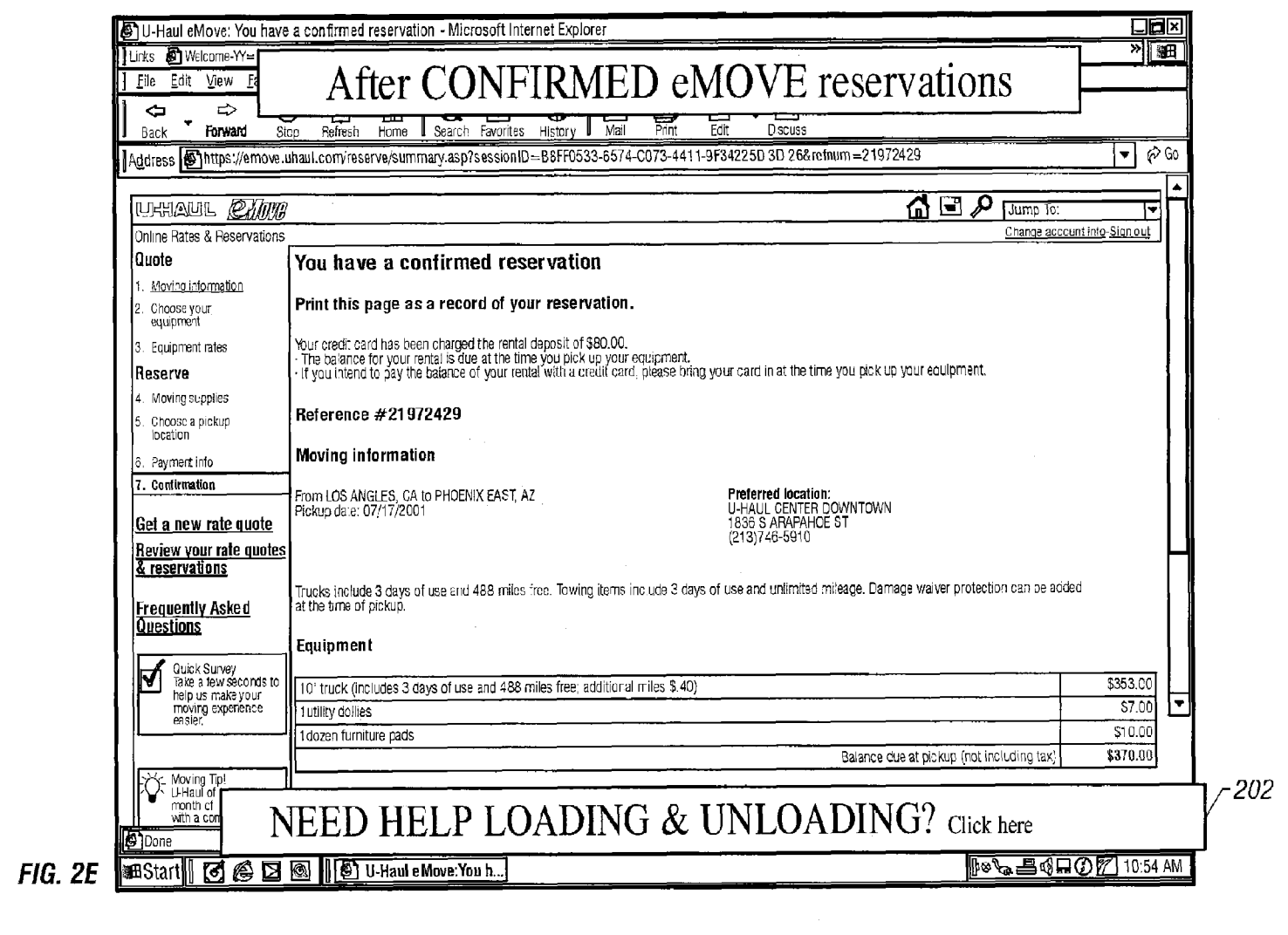

FIG. 2E is a screen shot showing a confirmed reservation and related information. At this stage the customer has completed the primary or originating transaction for which he to the host web site. He has reserved moving equipment and moving supplies for a specified length of time and specified pick-up and drop-off locations. At this stage the customer has also entered personal information such as address, phone number, and so on. The customer has also made a deposit to hold the reservation using a credit card.

Once the originating transaction is complete, the customer can begin thinking of auxiliary service he may need related to his move. At step 104 the customer selects an icon or link to access an online marketplace for moving services. This icon or link can take various forms. In a preferred embodiment, the icon is used to get the attention of the customer by offering a service the customer is most likely to need. In FIG. 2E this icon is box 202 containing the text "NEED HELP LOADING & UNLOADING? Click here". In another preferred embodiment, the icon can display other text such as "FIND A SERVICE PROVIDER IN YOUR AREA TO MEET YOUR MOVING NEEDS" or similar message.

Once the customer has clicked on icon 202, the customer has entered an online marketplace where he can choose auxiliary services needed for the move. At step 106 the customer selects services from a list of services available in the marketplace. These services include packing/unpacking, loading/unloading, carpet cleaning, furniture assembly, pool maintenance, auto mechanic services, computer maintenance, house cleaning, yard work, landscaping, real estate services, nails, messaging services (e.g., GPS), babysitting services, home improvement services, doctor referrals, lawyer referrals, school information, pet care providers, job searching services, neighborhood analysis, utility/phone connection, utility/phone connection services, long distance/cable services, handyman services, hairdressing services, and other services. An example of a screen shot offering typical services is shown in FIG. 3A. In a preferred embodiment, the customer completed an originating transaction, in this case renting moving equipment. Information regarding this transaction is shown in area 302. In other embodiments, the customer may not have an originating transaction and may directly enter the online marketplace in which case the customer may be prompted to enter which location or locations he will need the services. If he enters two locations, he will be presented with information as shown in area 304. The customer selects a service from lists 306. If the customer is moving within one city or community, one list will be displayed.

After selecting a service in step 106, at step 108 the customer selects a particular vendor for the selected service. FIG. 3B is an example of a screen shot showing a list of vendors for general moving help in two locations. A symbol 308 indicates that a vendor's identity has been verified by the host. As noted above, the host may use a third party service to verify the vendor's identity and contact information such as Experian, Inc or Equifax.

At step 110 the customer learns more about a particular vendor by clicking on the vendor listing. An informational screen such as shown in FIG. 3C is presented to the customer in which information such as a vendor rating 310 based on previous customer feedback and number of years listed 312 is provided. The customer can also view previous reviews 314 of the vendor. At area 316 some basic information on the vendor, such as rates and policy, is provided, as well as graphics such as a logo or photo of the vendor or a streaming video clip prepared by the vendor. At area 318 the vendor can provide personal or biographical data to prospective customers. Informational items 310 to 318 are intended to acquaint prospective customers with a vendor and make customers more comfortable in dealing with a particular vendor. It also allows the vendor to highlight aspects of their business that may appeal to customers. In other embodiments, the form, presentation and layout of this information may be different but the objective remains the same. In addition, in a format such as this where a customer selects the service and vendor based strictly on the needs of the customer, control over the terms of the transaction shifts from the vendor to the customer. Typically, the vendor dictates the terms, rates, and conditions of the service transaction and arrangement. With this process, the customer can now find a vendor he is comfortable with and select one that has an hourly rate or flat rate that fits within the customer's budget. In another preferred embodiment, the customer can post a proposal or request for a service and provide the parameters such as price, location, amount of time, dates, and so on. This is useful if there are hundreds of listings for a particular service and the customer is having difficulty selecting from the list and would rather have vendors come to him.

At step 112 the customer selects a vendor. This is done after reading the vendor information and by clicking on an icon 320 displayed at the bottom of FIG. 3C. The customer can also select a vendor directly from the lists shown in FIG. 3B. Once a vendor has been selected, the customer is taken through a scheduling and confirmation process based on customer input at step 114. The customer and vendor can also interact on a message board before confirming a transaction, described in step 116. FIG. 3D is a screen shot of a display where a customer schedules the selected service and confirms the service. Scheduling and cancellation information is entered in area 322. In a preferred embodiment the host will provide the customer with an estimate of the time the customer will likely need the particular service. This can be done using information entered to reserve the rental equipment, such as truck size, size of household, and so on. Information on the estimate of the number of hours or, more generally, the units of labor the customer will need to complete the service is provided in area 324. The host can derive estimates by assimilating historical, previous customer data and feedback, and by using expertise in the moving business it has gained over the years.

At step 116 the customer enters the number of hours of labor he wants to reserve and confirms the order. This is done in area 326. The customer can use the estimate provided by the host to enter this information. Again, the customer has control over how many hours he believes will be needed for the job. Thus, if he believes only one hour of labor will be needed, he can find vendors that do not have the typical minimum requirements of two hours labor or similar restrictions. The customer can also learn more about the vendor by going through the process described above than can be learned by simply looking in a newspaper classified section or the yellow pages, which are the most common methods of finding vendors. In addition, the customer can examine reviews provided by previous customers, pre-pay for services using the escrow services, and accessing listings in other geographic areas.

Once the customer has entered the amount of time he will need for the service, he is presented with an agreement regarding the use of the marketplace, fees, and transaction guidelines at step 118. A customer need not enter an agreement if he is only viewing content and browsing; it is only when he is going to enter into a transaction with a vendor that an agreement be necessary. The agreement is between the customer and the marketplace host and not with the vendor, and addresses the rules of using the marketplace. In a preferred embodiment, the online marketplace requires that a customer enter into a user agreement before transacting with vendors. There is one agreement between the host and the customer and another type of agreement between the host and the vendor. For each agreement, the executing party, i.e., the customer or the vendor, must electronically sign certain key provisions in the agreement or all the provisions. Unless the customer initials each provision for which an initial is requested, the customer will not be able to enter into the agreement. If he clicks the "I Accept" key or similar icon, an error message is returned.

Figure 4:
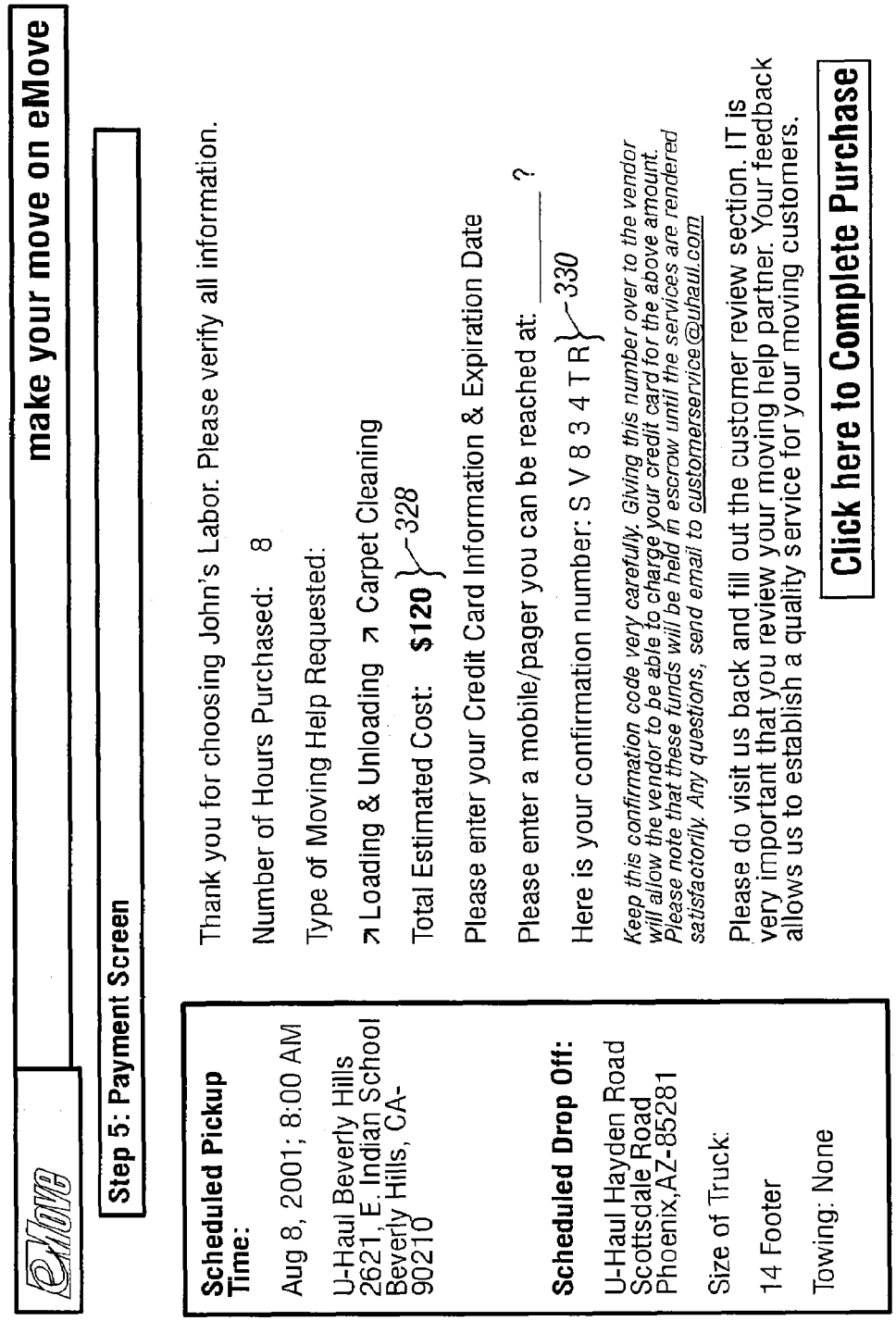
FIG. 4 is screen shot of a user interface in which a customer is provided with a summary of the service, confirmation code, and is given the opportunity to complete the transaction.

At step 120 the customer pays for the service using a credit card or other form of acceptable payment. An example of a payment screen is shown in FIG. 4. A total estimated cost 328, in this case $120, is displayed to the customer based on information entered in previous screens. The customer is also provided with a confirmation code 330 which is kept confidential by the customer. This confirmation code is provided to the vendor by the customer once the service is completed and the customer is satisfied with the work. The vendor uses the confirmation code, which acts as a key, to access an escrow account from which the vendor is paid. The host also receives its fee for operating and managing the marketplace and serving as a digital clearinghouse.

As mentioned above, in a preferred embodiment, the customer pre-pays the full or partial amount of the services, as best estimated by the customer with the assistance of the host, as shown in areas 324 and 326 of FIG. 3C. The amount paid by the customer is transferred to an escrow account maintained by a third party, such as PayPal or a host party's borrowing partner. Once the service has been completed, the vendor is paid directly from the escrow account. If there are any disputes regarding the service or payment, the funds are held in the account until the dispute is resolved. The host provides its own dispute resolution services or can use the services of a third party provider. By having such a service, the funds are kept secure in an escrow account until the dispute is settled. The vendor can use confirmation code 330 to access the account and obtain payment. In the preferred embodiment, the vendor must have an account or be a customer of the third party service selected by the host. For example, if PayPal is the third party service chosen by the host, the vendor must have an account with PayPal in order to receive payment from a PayPal business escrow account. In the preferred embodiment, the vendor logs onto the host site and accesses a restricted area on the site intended for vendors only. There the vendor enters the confirmation code and thereby releasing the funds from the escrow account to the vendor's account. At the same time, a certain amount is released to a host account for the host's services. Once the customer has made a payment to the escrow account, the process of obtaining a vendor is complete. Although the process has been described for one vendor, it can be used multiple times to purchase or reserve services from different vendors or multiple services from a single vendor.

In another preferred embodiment, the customer does not pre-pay for the service as described above. The customer pays the vendor directly when the service has been performed. In this embodiment, the customer may pay a fee to the host for providing the marketplace service, similar to a referral fee. Similarly, the vendor may pay the host for listing the vendor in the marketplace, essentially a flat fee for the listing. The fee covers expenses for operating the online marketplace, maintaining the platform, acting as a clearinghouse for transactions, providing dispute resolutions service, and so on. In another preferred embodiment, the host collects the fees after the transaction is completed with the vendor. In this scenario there is no pre-payment; the customer pays the full amount at the end of the transaction. Regardless of the revenue model, the goal of the online marketplace does not change. Customers of the host, e.g., those interested in renting a truck or trailer for moving, are provided with a convenient, seamless process of making arrangements for related, useful services. Providing this marketplace is a convenience for the customer and thus enhances the goodwill of the host or moving equipment rental company, in addition to providing an additional revenue source from which all parties can benefit. The seamless nature of the marketplace as it relates to the rental aspect of the host's site makes it conducive for customers to order services in the marketplace since a customer does not have to leave the host site. In another embodiment, the marketplace is hosted at a site different from the host site but the link to the marketplace site from the originating transaction site keeps the process of obtaining services seamless.

Over time, the online marketplace will accumulate data and track the buying habits of previous customers so it can make more accurate estimates of the amount of time needed for customers having similar characteristics, such as location, volume, and so on. The host can also make useful recommendations to customers based on what previous customers have done. For example, a customer renting a 10 foot truck may need about 2 hours of moving help, or the average vendor wage in New York City is $50 per hour. In another example, a customer loading a 26 foot truck in Phoenix will need about 5 hours as opposed to 8 hours in New York City because of extra steps.

The online marketplace of the present invention provides other benefits and revenue streams to the host. As described, the host is in the "do-it-yourself" moving business and may have developed a significant amount of goodwill and brand recognition amongst the public for the goods and services it provides. This goodwill and brand name recognition will draw a high volume of customers planning a move to the online marketplace. Thus, the marketplace attracts qualified customers in that a customer at the site is likely have a strong propensity to buy certain services. These services can be those that are not suitable for listing in the marketplace itself. For example, a real estate agency or mortgage loan company may be interested in advertising on the marketplace since they will be directing their ads to a relatively specific audience, namely, those thinking of moving or in the process of moving. Another example is advertising medical and dental services since customers may need such services after moving to a new community. Other examples include services not directly related to moving such as babysitting services. The types and number of advertisers can vary greatly but the underlying concept and revenue model remains the same. That is, the online marketplace can be used to advertise relevant goods and services to a qualified audience.

The host can determine what type of vendors will be listed in the marketplace. The qualifications of a vendor can be examined on a case-by-case basis or general thresholds can be set in order for a vendor to be listed on the site. For example, a host can list a college student with a good reputation in the community for loading and unloading but who may not have a significant volume of business or it may choose to list an individual who has been housecleaning in a certain area for many years and comes recommended. Alternatively, the host can list only companies or businesses that are of a certain size and do a certain amount of business annually. The manner in which vendors are selected is a determination left to the host. The host can also remove vendors from the marketplace based on criteria decided solely by the host. A vendor can be removed from the list by the host based on feedback from the customer or any of a number of other factors.

Figure 5:
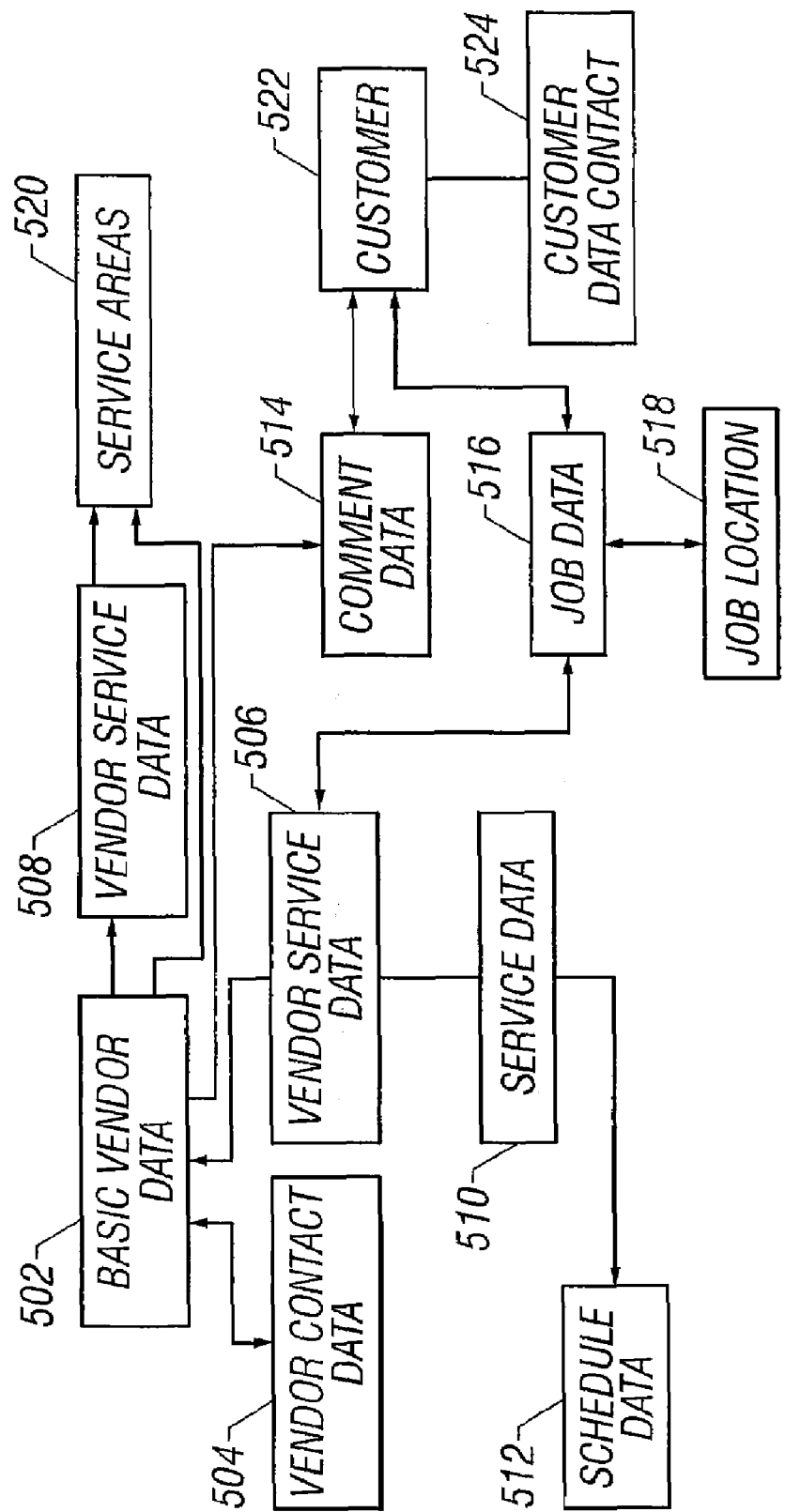
FIG. 5 is a block diagram showing various tables of data and their relationships in accordance with one embodiment of the present invention.

The online marketplace of the present invention is implemented by various types of data and applications. The data is organized in the form of groups or tables. FIG. 5 is a block diagram showing various tables of data and their relationships in accordance with one embodiment of the present invention.

Information regarding a specific vendor is stored in four separate tables: Basic Vendor Data table 502, Vendor Contact Data table 504, Vendor Service Data 506, and Vendor Service Areas 508. Table 504 contains data for identifying and contacting the vendor, such as address, social security number, cell phone number, and similar information. Table 502 contains other information such as a brief description of the vendor, status, password, photo URL, vendor ID, how long it has been a member, and so on. As with nearly all the tables, it also has pointers to related tables as shown in FIG. 5. Table 506 contains information on the services offered by the vendor, such as rates and service identifiers. If a vendor offers only one service, this table will contain one record for the vendor. Table 508 contains data on the areas serviced by the vendor. This list can include names of town, cities, metropolitan area, counties, and so on. A Service Data table 510 contains a list of all the broad categories of services available in the marketplace and is used by the online marketplace application to accept a service description from a customer and match the service with vendors offering the service, thus tables 510 and 506 share data. Service Data table 510 shares data with a Schedule Data table 512 which, in addition to the four vendor tables described above, also contains vendor specific data. Table 512 contains schedule data for a particular vendor, such as hours of operation for each day of the week. This data allows the marketplace application to handle scheduling between a customer and vendor.

Comment Data table 514 contains feedback and review data from customers regarding a specific vendor. Specifically, each comment from a customer is assigned a comment identifier, a date, rating, and vendor identifier. As described above, a customer can look at reviews of vendors by previous customers and can provide his own review of the service. Table 514 stores this data and associates it with the vendor so it can be retrieved and displayed when a customer makes a query.

Job Data table 516 stores data on individual transactions between a customer and a service offered by a vendor. This data is used to itemize each transaction between a customer and a service provided by a vendor. If a vendor has provided multiple services to a customer, there is a separate record for each service. It stores information such as completion date, confirmation code, job identifier, rate, transaction date, transaction time, and similar information. Job Location Data table 518 stores data on where the service was provided which is typically the old or new address of the customer, but may be different.

Service Areas table 520 stores the names of service areas as defined by the host. This data is then used to search for vendors operating in a particular service area. The customer enters a host-defined service area and tables 520 and 508 are used to retrieve vendors operating in the host-defined service area entered by the customer. A similar relationship exists between tables 510 and 506 in that the customer enters a host-defined service category. The data in tables 510 and 506 is used to retrieve vendors offering the service category entered by the customer.

Customer data is stored in Customer table 522 and Customer Contact Data table 524. In a preferred embodiment, this data is initially captured by the host when a customer is making a reservation for rental moving equipment, as described in FIGS. 2A to 2E. Table 522 contains many data fields that may not be used by the online marketplace application and are only needed for the reservation system. Some of the data fields stored in table 522 used by the online marketplace application include name, address, email, and password. Similar to Vendor Contact Data table 504, Customer Contact Data table 524 stores data relating to contact information for the customer such as address, phone number, and the like.

Figure 6:
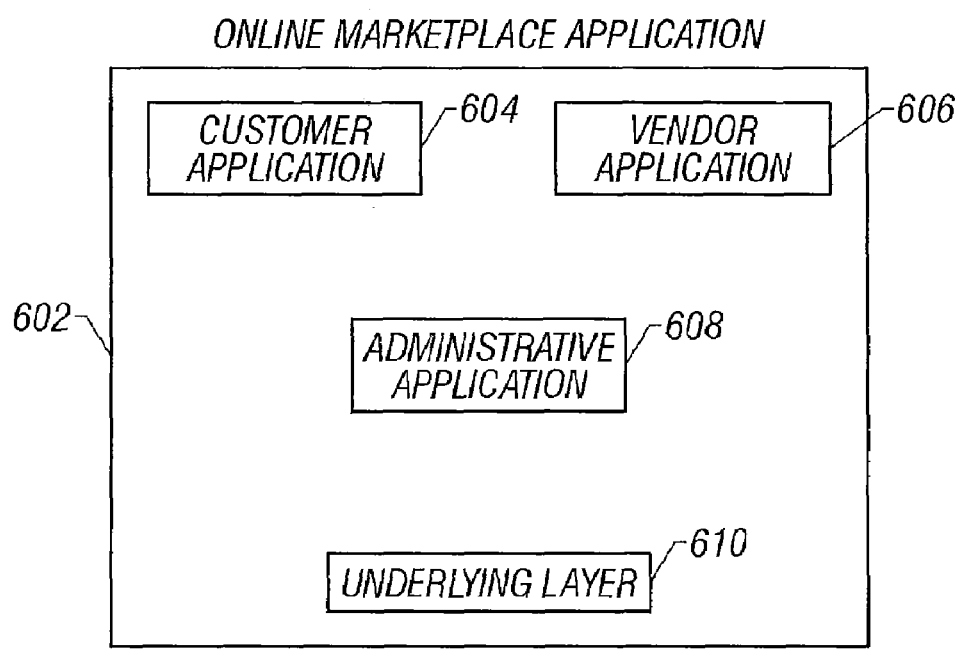
FIG. 6 is a block diagram of an online marketplace application in accordance with one embodiment of the present invention.

FIG. 6 is a block diagram of an online marketplace application in accordance with one embodiment of the present invention. An online marketplace application 602 contains four primary components: Customer Application 604, Vendor Application 606, Administrative Application 608, and Underlying Layer 610. Customer Application 604 allows the customer to navigate through the marketplace. It enables a customer to browse content of a selected vendor as described in FIGS. 3B and 3C and step 110 of FIG. 1B. It also provides the functionality of selecting and paying for a service from a particular vendor. After the service is completed, it provides the functionality for accepting feedback and comments from the customer regarding the vendor. It also allows a customer to review the transactions that have been paid for before and after a job is completed.

Vendor Application 606 provides functionality for vendors to complete necessary tasks. Initially, it processes vendors being added to the lists maintained by the host. It handles the logging on process for vendors entering the marketplace and processes confirmation codes entered by a vendor to transfer money from an escrow account to the vendor's account. It also processes scheduling services for the vendors and provides schedules to vendors. Administrative Application 608 allows an administrator of the online marketplace to oversee the entire application and perform basic administrative functions. A few examples of this include assigning a particular city to a service area or adding a new category of services to the services offered in the marketplace. It also allows an administrator to access data for analysis and creating statistics on customer behavior. Underlying Layer 610 provides the groundwork or foundation for the applications to function. For example, it maps the database described in FIG. 5 for the applications and determines the overall look and feel of the online marketplace application.

In another preferred embodiment, the customer can enter the marketplace directly without going through an initial transaction, such as renting a truck or trailer. By directly entering the marketplace, the customer can purchase services in a manner described above, with the additional steps of providing more personal information which would otherwise be captured from the host by the marketplace. In addition, the marketplace may provide estimates on the number of hours needed for a service based on queries posed directly to the customer since it cannot rely on information from a host. Once the customer has completed a transaction in the marketplace, he can enter a host web site from the marketplace to purchase other goods or services related to moving and relocating. Furthermore, the marketplace can offer services as well as goods related to moving from which a customer can select, although most of the items listed will likely be services such as those described above. Goods related to moving may include items such as boxes, packing supplies, and the like. The online marketplace may draw the customer to a site initially. For example, the customer may be thinking about all the services he may need weeks before the move or the time he will actually rent a trailer or truck. He may want to make arrangements for loading and unloading, packing, housecleaning, etc. first and then turn attention to renting moving equipment or making hotel reservations at his destination. From the marketplace, the customer can go to a web site for other such services or goods.

What is claimed is:

1. A method of providing, via a computer network marketplace, auxiliary services or goods relating to an originating transaction between a customer and a host, the method comprising:

processing an originating transaction by accepting customer input requested by a host;

enabling a customer in the computer network marketplace to access content regarding an auxiliary service or good relating to the originating transaction;

processing a secondary transaction for the auxiliary service or good between the customer and a vender listed in the marketplace;

accepting a payment from the customer for the service or good;

issuing to the customer a confirmation code associated with the secondary transaction; and after performance of the service or delivery of the good, activating a payment for the service or good in response to the vendor entering the confirmation code.

2. A method of providing, via a computer network marketplace, auxiliary services or goods relating to moving or relocating upon completion of an originating transaction relating to moving or relocating, the method comprising:

processing an originating transaction by accepting customer input;

enabling a customer in the computer network marketplace to access content describing an auxiliary service or good relating to the originating transaction;

listing at least one vendor that can provide the auxiliary service or good;

processing a secondary transaction for the auxiliary service or good between the customer and a vender; and accepting a payment from the customer for the auxiliary service or good;

issuing to the customer a confirmation code associated with the secondary transaction; and after performance of the service or delivery of the good, activating a payment for the service or good in response to the vendor entering the confirmation code.

3. A method of providing, via a computer network marketplace, auxiliary services or goods relating to moving or relocating upon completion of an originating transaction between a customer and a host, wherein the originating transaction also relates to moving or relocation, the method comprising:

processing an originating transaction by accepting customer input requested by a host;

enabling a customer in the computer network marketplace to access content regarding an auxiliary service or good, wherein the auxiliary service or good and the originating transaction relate to moving or relocating;

processing a secondary transaction for the auxiliary service or good between the customer and a vender listed in the marketplace;

accepting a payment from the customer for the service or good;

issuing to the customer a confirmation code associated with the secondary transaction; and after performance of the service or delivery of the good, activating a payment for the service or good in response to the vendor entering the confirmation code.

4. A method as recited in claim 3 wherein enabling a customer in the computer network marketplace to access content occurs after the originating transaction has been processed.

5. A method as recited in claim 3 wherein the content regarding an auxiliary service or good includes loading/unloading service information.

6. A method as recited in claim 3 wherein the content regarding an auxiliary service or good includes packing/unpacking service information and house cleaning service information.

7. A method as recited in claim 3 wherein the content regarding an auxiliary service or good includes landscaping service information, carpet cleaning service information, painting service information, and garbage removal service information.

8. A method as recited in claim 3 wherein the content regarding an auxiliary service includes hotel reservation information.

9. A method as recited in claim 3 further comprising displaying, in the marketplace, advertisements for goods or services relating to moving or relocating.

10. A method of providing, via a computer network marketplace, a first service or good relating to a second service or good, the method comprising:
- processing an originating transaction by accepting customer input requested by a computer network marketplace;
- enabling a customer in the marketplace to access content describing the second service or good relating to the originating transaction;
- processing a secondary transaction for the second service or good between the customer and a vendor wherein the vendor is introduced to the customer by the marketplace and wherein the customer input for the originating transaction captured by the marketplace is used by the host to expedite processing of the secondary transaction;
- issuing to the customer a confirmation code associated with the secondary transaction; and after performance of the second service or delivery of the second good, activating a payment for the second service or good in response to the vendor entering the confirmation code.

11. A method of providing a service or good relating to moving using a computer network marketplace, wherein the service is offered upon completion of an originating transaction between a customer and a marketplace, the method comprising:
- processing an originating transaction by accepting customer input requested by a computer network marketplace;
- enabling a customer in the marketplace to access content describing an auxiliary service or good relating to the originating transaction, wherein the auxiliary service or good and the originating transaction relates to moving;
- processing a secondary transaction for the service or good between the customer and a vender listed in the marketplace;
- accepting a payment from the customer for the service or good;
- issuing to the customer a confirmation code associated with the secondary transaction; and
- after performance of the service or delivery of the good, activating a payment for the service or good in response to the vender entering the confirmation code.

12. A computer system for providing auxiliary services or goods, via an online marketplace, relating to an originating transaction between a customer and a host, the system comprising:
- one or more processors;
- a computer readable memory accessible by the one or more processors, the computer readable memory containing programming instructions for:
- processing an originating transaction by accepting customer input requested by a host;
- enabling a customer in the marketplace to access content describing an auxiliary service or good relating to the originating transaction;
- processing a secondary transaction for the auxiliary service or good between the customer and a vender listed in the marketplace;
- accepting a customer payment for the service or good;
- issuing a customer a confirmation code associated with the secondary transaction; and
- after performance of the service or delivery of the good, activating a payment for the service or good in response to the vender entering the confirmation code.

* * * * *